United States Patent
Becker et al.

(10) Patent No.: US 6,870,366 B1
(45) Date of Patent: Mar. 22, 2005

(54) APPARATUS FOR SENSING VEHICLE SEAT POSITION

(75) Inventors: David L. Becker, White Lake, MI (US); Phillip J. Shandilis, Livonia, MI (US); Aaron M. Mills, Dexter, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 10/745,273

(22) Filed: Dec. 23, 2003

(51) Int. Cl.$^7$ .................................................. G01B 7/14
(52) U.S. Cl. ............................ 324/207.26; 324/207.2; 280/735
(58) Field of Search ........................ 324/207.11–207.13, 324/207.15–207.22, 207.24, 207.26; 280/727, 734–735; 73/DIG. 3

(56) References Cited

U.S. PATENT DOCUMENTS

| | | |
|---|---|---|
| 4,156,191 A | 5/1979 | Knight et al. |
| 5,500,589 A | 3/1996 | Sumcad |
| 5,644,225 A | 7/1997 | Alfors et al. |
| 6,095,555 A * | 8/2000 | Becker et al. ............... 280/735 |
| 6,127,821 A | 10/2000 | Ramsden et al. |
| 6,552,532 B1 | 4/2003 | Sako |
| 2002/0093332 A1 | 7/2002 | Schroeder et al. |
| 2002/0180427 A1 | 12/2002 | Schroeder et al. |
| 2003/0020465 A1 | 1/2003 | Wolfe |
| 2003/0030431 A1 | 2/2003 | Reininger |

\* cited by examiner

*Primary Examiner*—Bot LeDynh
(74) *Attorney, Agent, or Firm*—Tarolli, Sundheim, Covell & Tummino L.L.P.

(57) ABSTRACT

A sensor (80) for sensing the position of a ferromagnetic target (82) relative to the sensor includes a Hall effect device (184) responsive to a change in a magnetic field (240) acting on the Hall effect device. A magnet (182) produces a magnetic field (240) that acts on the Hall effect device (184). The target (82) changes the magnetic field (240) acting on the Hall effect device (184) as the position of the target relative to the sensor (80) changes. First and second flux collectors (186 and 190) are located on one side (194) of the magnet (182) for concentrating the magnetic field (240) on the Hall effect device (184). A third flux collector (192) is located on a second side (196) of the magnet (182) opposite the one side (194) for reducing the reluctance of a magnetic flux path through the target (82).

15 Claims, 4 Drawing Sheets

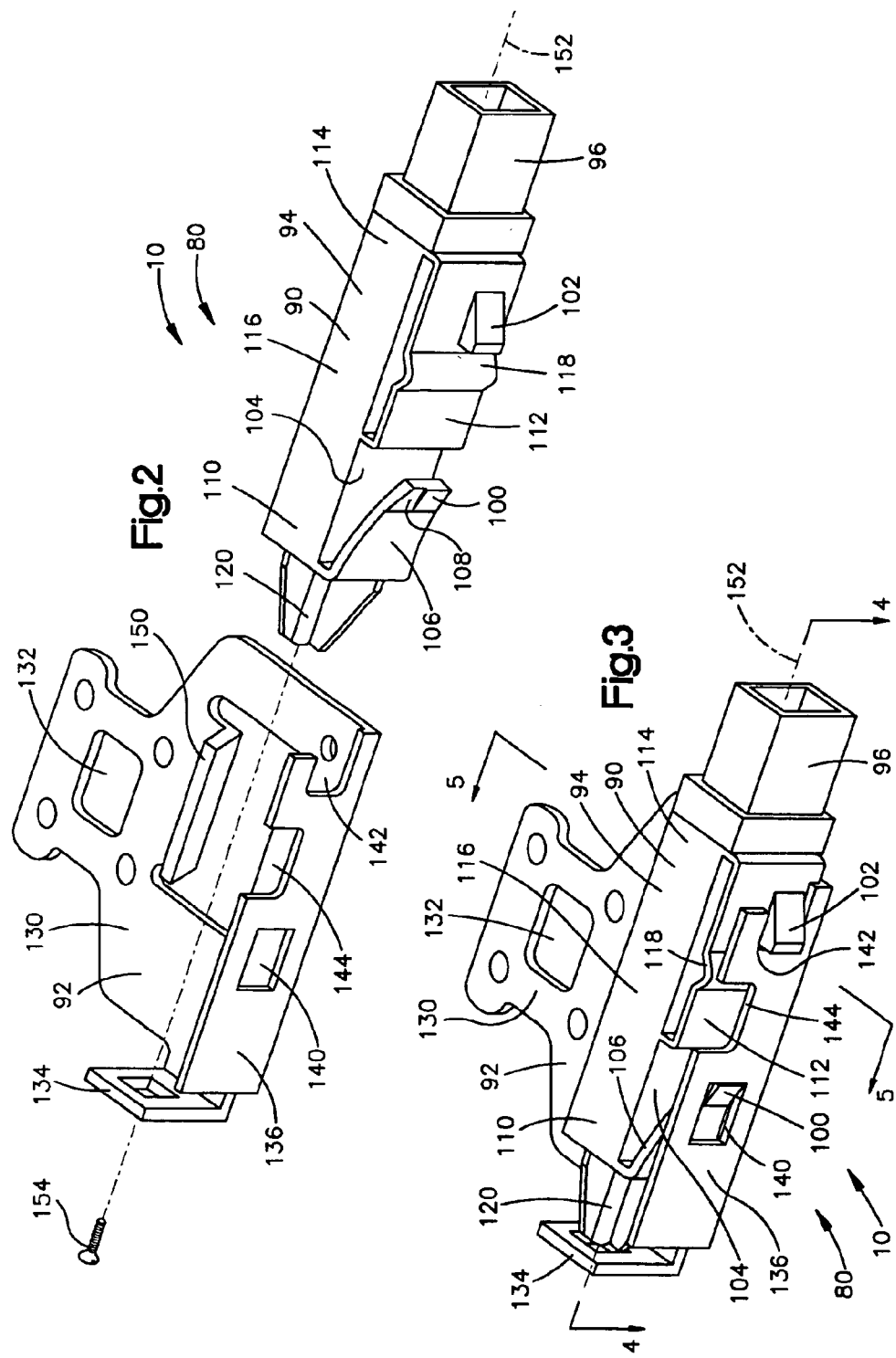

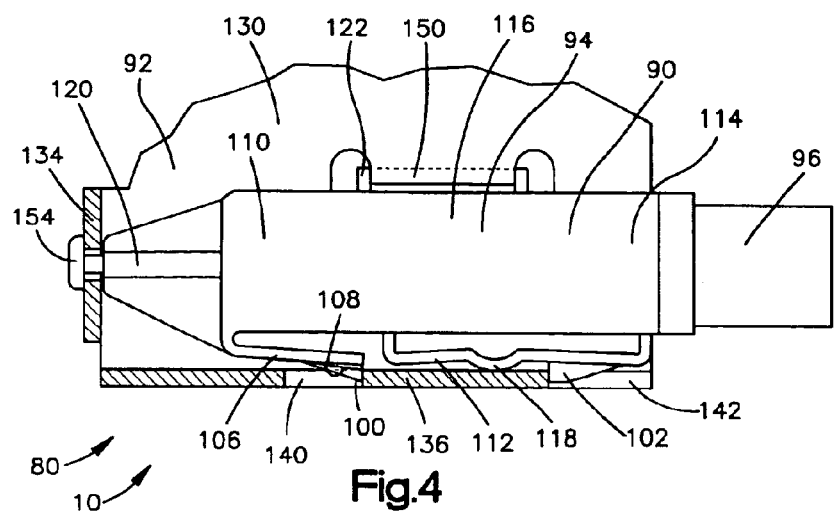
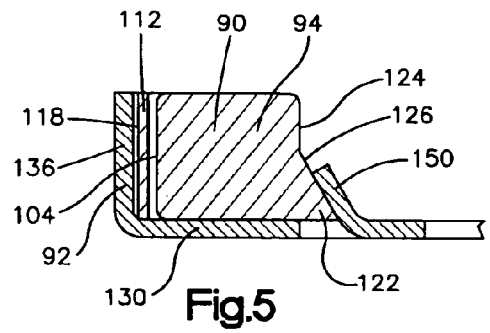
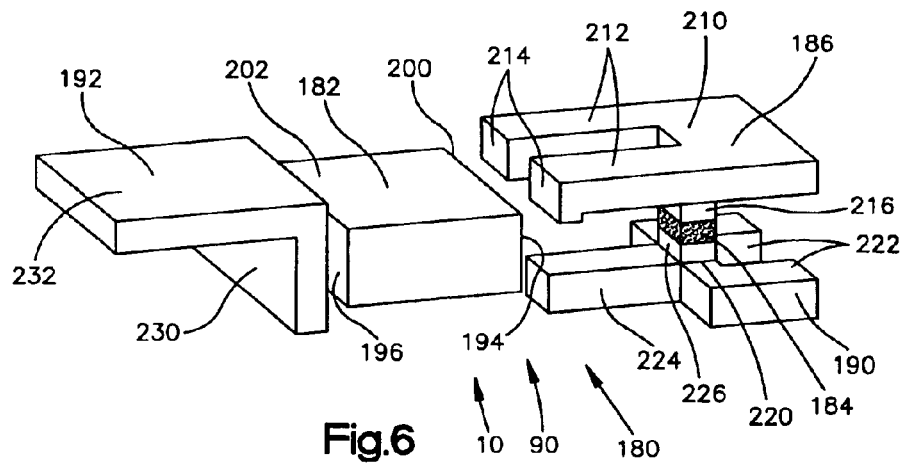

APPARATUS FOR SENSING VEHICLE SEAT POSITION

TECHNICAL FIELD

The present invention relates to a sensor for sensing the position of a seat in a vehicle.

BACKGROUND OF THE INVENTION

It may be desirable to alter or prevent the actuation of a vehicle occupant protection device, such as an air bag, depending on the position of the occupant relative to the protection device. To this point, numerous systems have been developed to detect the position of a vehicle occupant relative to the protection device. Known systems utilize ultrasonic sensors, infrared sensors, microwave sensors or a combination of various sensing devices to detect the position of a vehicle occupant. Other known systems determine the position of a vehicle occupant by detecting the position of the vehicle seat in which the occupant is seated. Such known systems utilize a variety of sensing devices, such as limit switches and potentiometers, to sense the seat position.

SUMMARY OF THE INVENTION

The present invention relates to a sensor for sensing the position of a ferromagnetic target relative to the sensor includes a Hall effect device responsive to a change in a magnetic field acting on the Hall effect device. A magnet produces a magnetic field that acts on the Hall effect device. The target changes the magnetic field acting on the Hall effect device as the position of the target relative to the sensor changes. First and second flux collectors are located on one side of the magnet for concentrating the magnetic field on the Hall effect device. A third flux collector is located on a second side of the magnet opposite the one side for reducing the reluctance of a magnetic flux path through the target.

The present invention also relates to a sensor for sensing the position of a ferromagnetic target relative to the sensor. The sensor includes a Hall effect device responsive to a change in a magnetic field acting on the Hall effect device. A magnet produces a magnetic field that acts on the Hall effect device. The target changes the magnetic field acting on the Hall effect device as the position of the target relative to the sensor changes. At least one flux collector is positioned adjacent a first pole of the magnet and concentrates the magnetic field on the Hall effect device. At least one flux collector is positioned adjacent a second pole of the magnet, opposite the first pole, and reduces the reluctance of a magnetic flux path through the target.

BRIEF DESCRIPTION OF THE DRAWINGS

The foregoing and other features of the invention will become more apparent to one skilled in the art upon consideration of the following description of the invention and the accompanying drawings in which:

FIG. 2 is an exploded perspective view illustrating a sensor assembly of the apparatus of FIG. 1;

FIG. 3 is a perspective view of the sensor assembly of FIG. 2 in an assembled condition;

FIG. 4 is a partial sectional view taken generally along line 4—4 in FIG. 3;

FIG. 5 is a partial sectional view taken generally along line 5—5 in FIG. 3;

FIG. 6 is a schematic perspective view of a sensor arrangement of the sensor assembly of FIGS. 2–5.

DESCRIPTION OF AN EMBODIMENT

Figure 1:
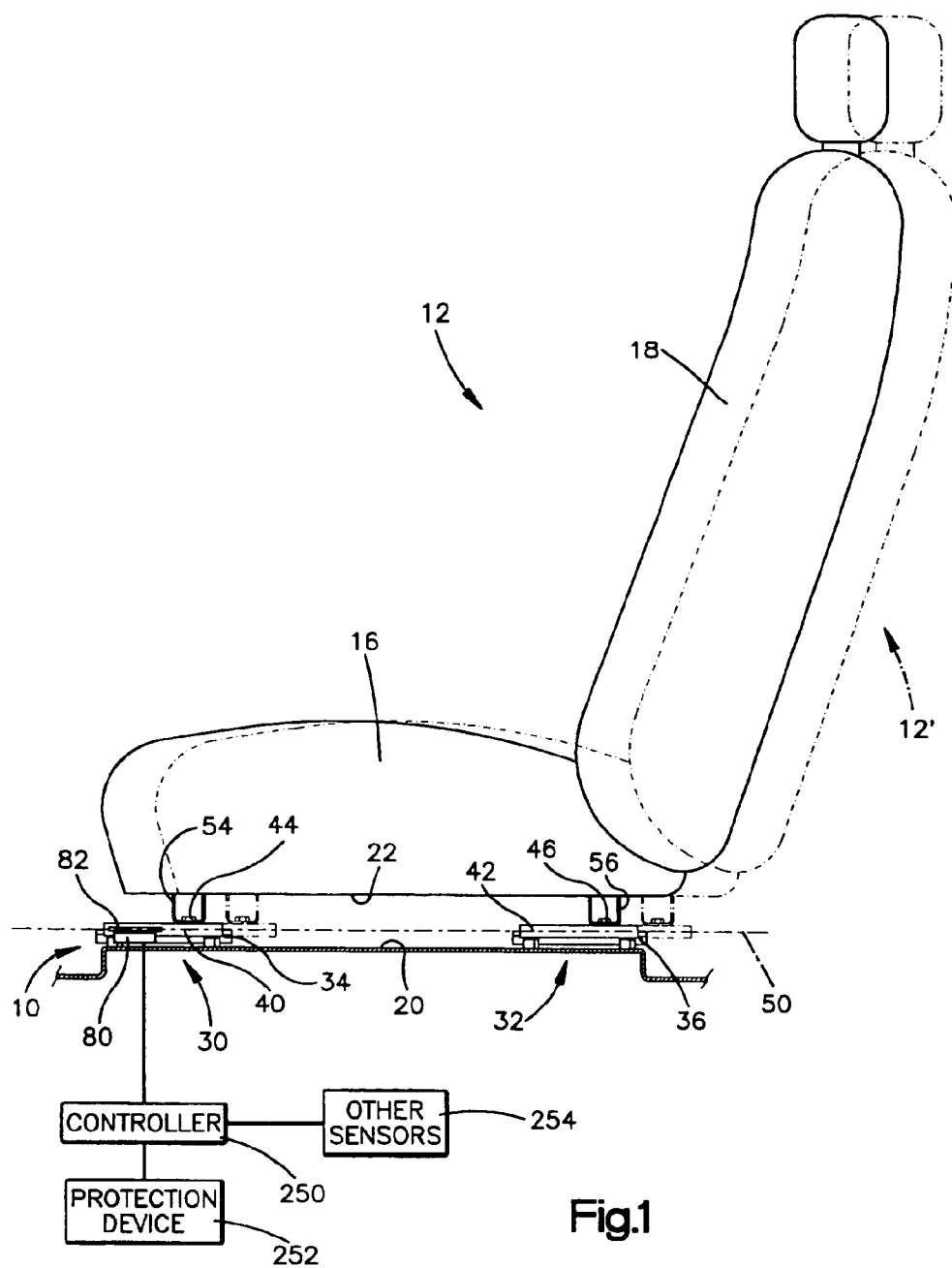
FIG. 1 is a schematic representation of a side elevation of an apparatus for sensing vehicle seat vehicle in accordance with an embodiment of the present invention.

FIG. 1 illustrates an apparatus 10 for sensing the position of a seat 12 in a vehicle 14. The seat 12 includes a seat cushion portion 16 and a seat back portion 18 extending upwardly from the seat cushion portion 16. The seat 12 is located within an occupant compartment of the vehicle 14 and is adjustably (movably) mounted to a lower body portion 20 of the vehicle. The seat 12 is illustrated in solid lines in a forward position, and in dotted lines in a rearward position designated at 12'.

The particular manner in which the seat 12 is moved forward and rearward is not critical to the present invention. The seat may be moved forwardly and rearwardly, for example, by actuating an appropriate electric motor (not shown) operatively coupled to the seat 12 or by manual adjustment after releasing a seat latch through means, such as a release lever (not shown).

Forward and rearward movement of the vehicle seat 12 is guided by seat tracks, indicated at 30 and 32. While FIG. 1 illustrates a pair of such seat tracks 30 and 32, it will be appreciated that typically there are four such seat tracks near the corner portions of a lower surface 22 of the seat cushion portion 16. Alternatively, there could be a single seat track on each lateral side of the seat 12 that extends from the front of the seat to the rear of the seat.

Each seat track 30 and 32 includes a lower track member, indicated at 34 and 36, respectively, mounted to the lower body portion 20 of the vehicle 14. The lower track members 34 and 36 are formed of a suitable rigid material such as steel. Each seat track 30 and 32 also includes an elongated upper track member 40 and 42, respectively, that is mounted to the lower surface 22 of the seat cushion portion 16 by respective fasteners 44 and 46. Each upper track member 40 and 42 is supported by a respective one of the lower track members 30 and 32 for relative axial movement along a track axis 50. Thus, the guide tracks 30 and 32 support the seat 12 and allow for forward and rearward movement of the seat in the vehicle 14.

As shown in FIG. 1, the seat cushion portion 16 is mounted to and spaced apart from the upper track members 40 and 42 by respective frame members 54 and 56. The frame members 54 and 56 extend downwardly from the lower surface 22 of the seat cushion portion 16. The frame members 44 and 46 are secured to the upper track members 40 and 42 by the fasteners 44 and 46, respectively.

The seat tracks 30 and 32 described above are illustrative of but one seat track arrangement with which the apparatus 10 of the present invention may be implemented. Those skilled in the art will appreciate that the apparatus 10 of the present invention may be implemented or otherwise used with any known type of seat track. It will also be appreciated that the apparatus 10 of the present invention may not require seat tracks for its implementation. The apparatus 10 could be mounted to other parts, such as to the seat and/or to the lower body portion 20 of the vehicle 14.

Referring to FIG. 1, the apparatus 10 includes a sensor assembly 80 and a target 82. The sensor assembly 80 is mounted at a fixed position adjacent or near the seat track 30 at the front portion of the seat 12. For example, the sensor assembly 80 may be mounted on the lower track member 34. The target 82 is mounted at a position to be movable with the vehicle seat 12 in a direction parallel to the axis 50. For example, the target 82 may be mounted on the upper track member 40.

The target 82 is thus movable relative to the sensor assembly 80 in a direction parallel to the axis 50.

The sensor assembly 80 and target 82 could be mounted at locations other than those illustrated in FIG. 1. For example, the sensor assembly 80 and target 82 could be mounted at locations adjacent or near the seat track 32 at the rear portion of the seat 12. Also, the sensor assembly 80 could be movably mounted, such as to the upper track member 40, and the target 82 could be fixedly mounted, such as to the lower track member 34. Further, instead of being a separately mountable piece, the target 82 could be an existing portion of the vehicle 14, such as a portion of the upper track member 40 that is formed or otherwise configured to have the shape and size of the target.

Referring to FIGS. 2–5, the sensor assembly 80 includes a sensor 90 and a bracket 92. The sensor 90 includes a housing 94 that supports sensor components (not shown in FIGS. 2–5) that will be described in further detail below. The housing 94 may be constructed of any suitable material, such as molded plastic. The sensor 90 also includes a connector portion 96 for providing an electrical connection between the sensor 90 and vehicle electronics, which will be described herein below.

The housing 94 and the bracket 92 are configured to cooperate with each other to provide a releasable connection between the sensor 90 and the bracket. The housing 94 includes first and second latch members 100 and 102, respectively, that project away from a first surface 104 of the housing. The first latch member 100 is fixed to a cantilever spring arm 106 that projects from the first surface 104 at a leading end 110 of the sensor 90. The cantilever spring arm 106 includes a projection 108 positioned adjacent the first latch member 100. The second latch member 102 is fixed to a dually constrained spring arm 112 that has opposite ends that project from the first surface 104 at a trailing end 114 and midsection 116 of the housing 94. The dually constrained spring arm 112 includes a centrally located projection 118.

The housing 94 also includes a fastener receiving portion 120 that projects from the leading end 110 of the housing. Referring to FIG. 5, the housing 94 also includes a ramp portion 122 that projects from a second surface 124 of the housing, opposite the first surface 104. The ramp portion 122 has an angled surface 126 that extends at an acute angle relative to the second surface 124.

Referring to FIGS. 2–5, the bracket 92 includes a base portion 130 that includes a fastener aperture 132 for receiving a fastener, such as a bolt (not shown) for connecting the bracket, and thus the sensor assembly 80, to a mounting location, such as on the lower track member 34 (see FIG. 1). The bracket 92 also includes a fastener flange 134 and a support flange 136 that extend perpendicularly from the base portion 130. The bracket 92 further includes a ramp portion 150 that extends at an acute angle from the base portion 130.

The support flange 136 includes first and second latch receiving portions 140 and 142, respectively. The first latch receiving portion 140 comprises an aperture that extends through the support flange 136. The second latch receiving portion 142 comprises a recess that extends into the support flange 136 from a rear edge of the support flange. The support flange 136 may also include a recess 144 that extends into the support flange from an upper edge of the support flange.

To assemble the sensor 90 and the bracket 92 in order to form the sensor assembly 80, the sensor and bracket are arranged as shown in FIG. 2 and the sensor is moved along an axis 152 into the bracket. As best shown in FIG. 5, as the sensor 90 is inserted into the bracket 92, the ramp portion 122 of the housing 94 engages and slides along the ramp portion 150 of the bracket. As shown in FIG. 5, the acute angles along which the ramp portions 122 and 150 are formed causes the surface 126 of the ramp portion 122 to form a mated engagement with the ramp portion 150.

Referring to FIGS. 2–5, as the sensor 90 is moved into the bracket 92, the cantilever spring arm 106 and the dually constrained spring arm 112 deflect to permit the first latch member 100 and the projection 118 to slide over the support flange 136. The first and second latch receiving portions 140 and 142 may be offset with each other so that the first latch member 100 does not engage the second latch receiving portion when the sensor 90 is initially moved into the bracket 92. When the sensor 90 moves beyond a predetermined point, the cantilever spring arm 106 biases the first latch member 100 into the first latch receiving portion 140. At this point, the second latch member 102 engages the second latch receiving portion 142. The first and second latch members 100 and 102 thus cooperate with the first and second latch receiving portions 140 and 142 to help block movement of the sensor 90 relative to the bracket 92 in directions along the axis 152.

While the first and second latch members 100 and 102 are engaged with the first and second latch receiving portions 140 and 142, the protrusions 108 and 118 engage the support flange 136 and the cantilever and dually constrained spring arms 106 and 112 bias the sensor 90 away from the support flange. This urges the surface 126 of the sensor ramp portion 122 into engagement with the ramp portion 150 of the bracket 92. The cantilever and dually constrained spring arms 106 and 112 and the ramp portions 122 and 150 thus cooperate to help block movement of the sensor 90 relative to the bracket 92 in directions transverse to the axis 152. For added security, a fastener 154 may be inserted through the aperture in the fastener flange 134 and into the fastener portion 130 of the sensor 90 to thereby connect the sensor to the bracket 92.

To remove the sensor 90 from the bracket 92, one simply removes the fastener 154, if present, and moves the first latch member 100 out of the first latch receiving portion 140 by depressing the first latch member against the bias of the cantilever spring arm 106. The dually constrained spring arm 112 may be accessed through the recess 144 and may also be depressed against its spring bias in order to disengage the protrusion 118 from the support flange 136. The sensor 90 may then be slid along the axis 152 to remove the sensor from the bracket 92.

Referring to FIG. 6, the sensor 90 includes components 180 that are packaged in the housing (not shown in FIG. 6). The components 180 may be supported in the housing by any suitable means, such as a press-fitting, an adhesive, by packaging the components using a potting material (e.g., an epoxy resin), or by a combination thereof. The components 180, when supported in the housing, are arranged in the general relative configuration shown in FIG. 6. Since FIG. 6 is a schematic illustration, minor details of the components 180 may have been omitted from FIG. 6 for clarity. This may not, however, affect the functionality of the sensor 90.

The components 180 include a permanent magnet 182, a Hall effect device 184, a ferromagnetic first or upper flux collector 186, a ferromagnetic second or lower flux collector 190, and a ferromagnetic third or return flux collector 192. The Hall effect device 184 is sandwiched between the upper and lower flux collectors 186 and 190. The magnet 182 has opposite poles 200 and 202 at opposite ends of the magnet. The upper flux collector 186, lower flux collector 190 and Hall effect device 184 are positioned adjacent the pole 200 of the magnet 182. The return flux collector 192 is positioned adjacent the pole 202 of the magnet 182.

The upper flux collector 186 has a generally U-shaped configuration with a base portion 210 and a portion bifurcated to provide spaced parallel leg portions 212 that extend from the base portion. The leg portions 212 terminate with an enlarged portion 214 spaced close to a first end surface 194 and the pole 200 of the magnet 182. The upper flux collector 186 also includes a support portion 216 that protrudes from the base portion 210 at a position near the intersection of the leg portions 212 and the base portions. The support portion 216 is positioned close to or in abutting engagement with the Hall effect device 184.

The lower flux collector 190 has a generally Y-shaped configuration with a base portion 220 and a portion bifurcated to provide spaced parallel first leg portions 222 that extend from the base portion away form the magnet 182. A second leg portion 224 extends from the base portion 220 in a direction opposite the first leg portions 222 and terminates spaced close to the first end surface 194 and pole 200 of the magnet 182. The lower flux collector 190 also includes a support portion 226 that protrudes from the base portion 220 at a position near the intersection of the first and second leg portions 222 and 224. The support portion 226 is positioned close to or in abutting engagement with the Hall effect device 184. The Hall effect device 184 is thus sandwiched between the support portions 216 and 226 of the upper and lower flux collectors 186 and 190.

The return flux collector 192 has a generally L-shaped configuration with a first leg portion 230 that is positioned spaced close to a second end surface 196, opposite the first end surface 194, and the pole 202 of the magnet 182. The first leg portion 230 extends generally parallel to a second end surface 196 of the magnet 182. A second leg portion 232 extends perpendicularly from the first leg portion 230 in a direction away from the magnet 182.

The Hall effect device 184 is an integrated circuit that has an output that changes in response to changes in the flux density of a magnetic field acting on a Hall effect transducer. In the embodiment illustrated in FIGS. 1–6, the hall effect device 184 is a bipolar Hall effect device. Such bipolar Hall effect devices are actuatable between two discrete conditions based on the flux density of a magnetic field acting on the Hall effect device. For example, a bipolar Hall effect device may have an "off" condition and a corresponding output when a magnetic field of a flux density below a predetermined level acts on the device. This bipolar Hall effect device may also be actuated to an "on" condition with a corresponding output when a magnetic field of a flux density at or above the predetermined level acts on the device. Alternatively or conversely, a bipolar Hall effect device may have an "on" condition when a magnetic field of a flux density below a predetermined level acts on the device. This bipolar Hall effect device may also be actuated to an "off" condition when a magnetic field of a flux density at or above the predetermined level acts on the device.

Figure 7A:
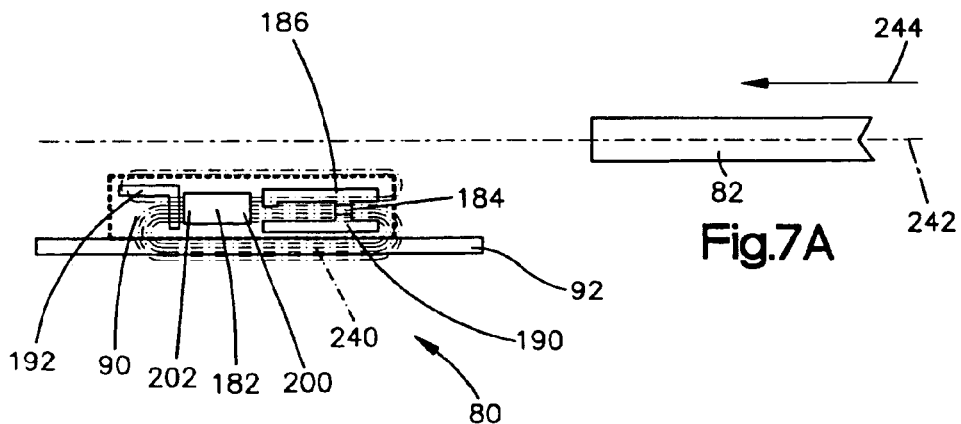
FIGS. 7A–7C are schematic views illustrating the sensor arrangement of FIG. 6 in different conditions.
Figure 7B:
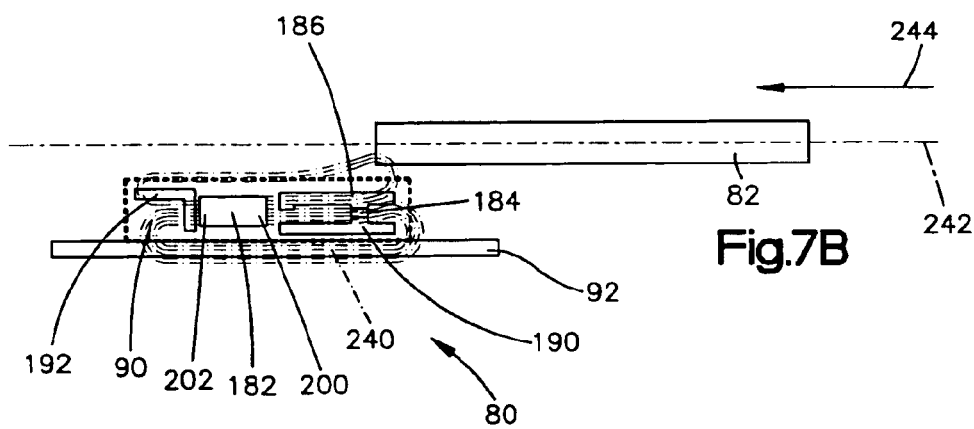
Figure 7C:
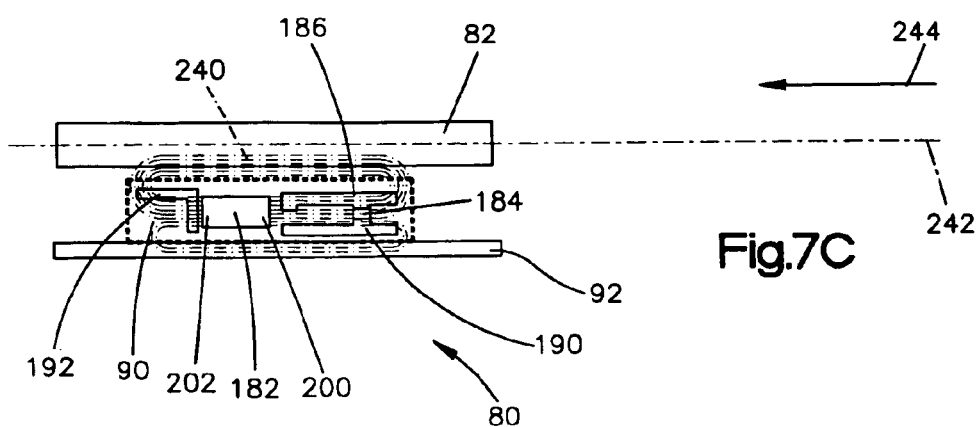

Referring to FIGS. 7A–7C, when the sensor assembly 80 is installed in the vehicle, the sensor 90 is placed in the above described position relative to the vehicle seat (not shown in FIGS. 7A–7C). In this position, magnetic flux is conducted between the poles 200 and 202 of the magnet 182 through a flux path that is dictated by a variety of factors. The upper flux collector 186, lower flux collector 190, and return flux collector 192, along with the bracket 92 and the surrounding ferromagnetic components of the vehicle, e.g., the adjacent seat track, vehicle floor, etc., all may help define this flux path.

As shown in FIG. 7A, the flux collectors 186, 190, and 192 form parallel flux paths through which magnetic flux may flow between the poles 200 and 202 of the magnet 182. This is achieved, at least in part, as a result of the configuration of the upper flux collector 186, lower flux collector 190, and return flux collector 192.

Referring to FIG. 6 in combination with FIG. 7A, the space between the leg portions 212 of the upper flux collector 186 is aligned vertically with the second leg portion 224 of the lower flux collector 190. This helps prevent flux leakage between the upper and lower flux collectors 186 and 190. The base portion 210 and the second leg portions 222 help prevent flux leakage to adjacent ferromagnetic parts of the vehicle. The support portions 216 and 226 help concentrate magnetic flux on the Hall effect device 184.

The return flux collector 192 provides a low reluctance path for conducting return flux to the pole 202 of the magnet 182. The return flux collector 192 may also help reduce the reluctance of the magnetic flux path through the target 82. As shown in FIG. 7A, the bracket 92, being in abutting engagement with the sensor 90, may also help provide the low reluctance flux path between the poles 200 and 202.

The flux path is indicated generally by flux lines identified generally at 240 in FIGS. 7A–7C. The flux lines 240 may also be indicative of the flux density of the magnetic field of the magnet 182. For purposes of simplicity in illustration, the flux lines 240 are illustrated in FIGS. 7A–7C as extending between the magnet poles 200 and 202 in a manner that may be more even and uniform than actual. Those skilled in the art, however, will appreciate that the flux lines 240 may extend in a more uneven and/or non-uniform manner. For purposes of illustration, however, the flux lines 240 of FIGS. 7A–7C are sufficient to show how the flux path varies as the ferromagnetic surroundings of the sensor 90 change.

The target 82 is movable with the vehicle seat along a path travel illustrated generally at 242. The path 242 extends adjacent the sensor 90. As the position of the vehicle seat is adjusted forwardly and rearwardly, the target 82 moves along the path 242. With reference to the embodiment illustrated in FIGS. 7A–7C, the sensor 90 will be described herein as being used to detect a forward position of the vehicle seat. The forward direction of seat travel is indicated generally by the arrow labeled 244 in FIGS. 7A–7C. It will be appreciated, however, that the sensor 90 could be used to detect a rearward position or any other desired position of the vehicle seat.

As the target 82 moves along the path 242, it may become positioned adjacent the sensor 90. The target 82, when positioned adjacent or near the sensor 90, affects the flux path 240. The target 82, being constructed of a ferromagnetic material, attracts the magnetic field produced by the magnet 182, which alters the flux path 240. The degree to which the target 82 alters the flux path 240 depends at least partially on the size, i.e., the mass or volume, of the portion of the target 82 positioned adjacent the magnet 182. As a result, the flux density acting on the Hall effect device 184 may vary in response to the position of the target 82 relative to the sensor 90.

As shown in FIG. 7A, when the target 82 is positioned rearward relative to the sensor 90, i.e., when the seat is positioned rearwardly, the target 82 has little or no effect on the flux path 242. In this condition, the bracket 92 forms a relatively large ferromagnetic mass adjacent and beneath the sensor 90. In this condition, the flux path 242 extends largely through the lower flux collector 190, bracket 92, and return flux collector 192. When the target 82 is in this position, the magnetic field acting on the Hall effect device 184 may have a relatively high flux density. The Hall effect device 184 may thus have a corresponding condition, such as a "high" or "on" condition with a corresponding output.

Referring to FIG. 7B, as the seat moves in the forward direction 244, the target 82 begins to move into the vicinity of the sensor 90 and begins to alter the flux path between the poles 200 and 202 of the magnet 182. This is indicated by the flux lines 240 of FIG. 7B, which are drawn toward the target 82. This may begin to alter the flux density of the magnetic field acting on the Hall effect device 184. This alteration may not, however, be of a magnitude sufficient to effectuate a change in the state of the Hall effect device 184.

Referring to FIG. 7C, as the seat moves further in the forward direction 244, the target 82 moves to a position adjacent the sensor 90. The target 82 has a relatively large cross-sectional area and thus comprises a large ferromagnetic mass adjacent the sensor 90, which causes a significant alteration of the flux path between the poles 200 and 202. This is indicated by the flux lines 240 of FIG. 7C. This change in the flux path alters the flux density of the magnetic field acting on the Hall effect device 184 to an extent sufficient to effectuate a change in the state of the Hall effect device.

The flux path 240 is drawn from the magnet 182 through the upper flux collector 186 and to the target 82. The flux path 240 continues through the target 82 to the return flux collector 192 and back to the magnet 182. The direction of the flux flow between the poles 200 and 202 depends on the polarization of the poles. The upper flux collector 186 extends parallel and close to the target 82 and is positioned close to the pole 200 of the magnet 182. The return flux collector 192 extends parallel and close to the target 82 and is positioned close to the pole 202 of the magnet 182. The upper flux collector 186, return flux collector 192, and target 82 thus provide a low reluctance path between the poles 200 and 202 of the magnet 182 when the apparatus 10 is in the condition of FIG. 7C.

Thus, when the seat moves to a predetermined forward position, the apparatus 10 may be placed in the condition of FIG. 7C. In this condition, the target 82 moves to a position relative to the sensor assembly 80 that effectuates a change in the state of the Hall effect device 184. When the target 82 is in this position, the magnetic field acting on the Hall effect device 184 may have a relatively low flux density. The Hall effect device 184 may thus have a corresponding condition, such as a "low" or "off" condition with a corresponding output. This change of state in the Hall effect device 184 is thus indicative of the seat being positioned at or forward of the predetermined forward position in the vehicle.

The information provided by the apparatus 10 can be used to control the operation of a vehicle occupant protection device. Depicted schematically in FIG. 1, the output signal from the sensor assembly 80, i.e., the Hall effect device 184, is directed to a controller 250. The controller 250 may comprise a microcomputer, an integrated circuit, a plurality of discrete components or a combination of integrated circuits and discrete components configured to provide desired functions.

The controller 250 is electrically coupled to an actuatable vehicle occupant protection device 252 that is actuatable upon the occurrence of an event for which occupant protection is desired to help protect a vehicle occupant. The protection device 252 may, for example, be an air bag, such as for a driver or front passenger of the vehicle. Other examples of actuatable vehicle occupant protection devices that can be used in accordance with the present invention include side curtains, side impact air bags, inflatable knee bolsters, and knee bolsters operated by inflatable air bags. The controller 250 also is coupled to other sensors, schematically indicated at 254. The other sensors 254 may include, for example, a crash sensor, a seat belt buckle switch sensor, a vehicle speed sensor, an occupant weight sensor or any other sensing device or combination of devices which provide useful information concerning actuation of the protection device 252. The other sensors 254 provide signals to the controller 250 indicative of one or more vehicle and/or occupant conditions.

The controller 250 utilizes the output signal from the sensor assembly 80 to control the actuation of the protection device 252. For example, where the output signal of the sensor assembly 80 indicates that the seat 12 is at or forward of a predetermined forward position, the controller 250 may control actuation of the occupant protection device 252 so that its inflation is somewhat delayed. Under appropriate circumstances, the output signal of the sensor assembly also might be used by the controller 250, in combination with the signals from the other sensors 254, to delay or even prevent actuation of the protection device 252.

Those skilled in the art will appreciate that the configuration of the apparatus may depart from that disclosed in the illustrated embodiment without departing from the spirit of the present invention. For example, in the illustrated embodiment, the apparatus 10 is configured such that the target 82 reduces the flux density of the magnetic field acting on the Hall effect device 184 as the seat 12 moves from the rearward position toward the forward position. The apparatus 10 could, however, be configured such that the flux density of the magnetic field acting on the Hall effect device 184 increases as the seat 12 moves from the rearward position to the forward position.

As another example, in the illustrated embodiment, the Hall effect device 184 and the magnet 182 have a fixed position on the vehicle 14. The target 82 is movable with the seat 12 relative to the Hall effect device 184 and the magnet 182. The present invention could, however, be configured such that the target 82 has a fixed position on the vehicle 14 and the Hall effect device 184 and magnet 182 are movable with the seat 12 relative to the target.

As another example, in the illustrated embodiment, the target 82 alters the flux path of the magnetic field to attract the field away from the Hall effect device 184. The apparatus 10 could, however, be configured such that the target 82 alters the flux path of the magnetic field to attract the field toward the Hall effect device 184.

As a further example, instead of being bipolar, the Hall effect device 184 of the present invention could be a ratiometric Hall effect device. A ratiometric Hall effect device has an output signal that varies as a function of the flux density of the magnetic field acting on the Hall effect device. The output signal of the ratiometric Hall effect device could be implemented in a circuit that is configured such that the current or voltage of the output signal varies as a function of the flux density of the magnetic field acting on the Hall effect device. Such a ratiometric Hall effect device may be used in the sensor configuration of the present invention to provide a signal that varies as a function of seat position instead of an "on/off" signal indicative of whether the seat has reached a predetermined forward position. In this configuration, the sensor would provide a variable signal indicative of actual seat position instead of a discrete signal indicative of the seat being at or forward of a predetermined position.

From the above description of the invention, those skilled in the art will perceive improvements, changes and modifications. Such improvements, changes and modifications within the skill of the art are intended to be covered by the appended claims.

Having described the invention, the following is claimed:

1. A sensor for sensing the position of a ferromagnetic target relative to the sensor, said sensor comprising:
   a Hall effect device responsive to a change in a magnetic field acting on said Hall effect device;
   a magnet for producing a magnetic field that acts on said Hall effect device, said target changing the magnetic field acting on said Hall effect device as the position of the target relative to the sensor changes;
   first and second flux collectors located on one side of said magnet for concentrating said magnetic field on said Hall effect device; and
   a third flux collector located on a second side of said magnet opposite said one side for reducing the reluctance of a magnetic flux path through the target.

2. The sensor recited in claim 1, wherein said third flux collector is L-shaped and has one leg of the L-shape extending parallel to a path of relative movement of said target and said sensor and the other leg of the L-shape extending adjacent and facing said magnet.

3. The sensor recited in claim 1, wherein said first flux collector has a first portion extending parallel to a path of relative movement of said target and said sensor and a second portion extending transverse to said first portion and terminating adjacent to said Hall effect device.

4. The sensor recited in claim 3, wherein said first portion of said first flux collector is bifurcated at one end thus having two spaced apart portions.

5. The sensor recited in claim 4, wherein said second flux collector has a third portion extending parallel to a path of relative movement of said target and said sensor and located in alignment with said space and a fourth portion projecting transverse to said third portion and terminating adjacent to said Hall effect device.

6. The sensor recited in claim 5, wherein said second flux collector has a fifth portion that extends from said fourth portion in a direction opposite the direction said third portion extends from said fourth portion to minimize flux leakage to adjacent parts.

7. The sensor recited in claim 6, wherein said fifth portion is bifurcated.

8. The sensor recited in claim 1, wherein said first and second flux collectors are located adjacent a first pole of said magnet and said third flux collector is located adjacent a second pole of said magnet, opposite said first pole.

9. The sensor recited in claim 1, wherein said target, said magnet, said first flux collector and said third flux collector form a low reluctance flux path when said target is at a predetermined position adjacent said sensor, said low reluctance flux path drawing the magnetic field away from said Hall effect device to actuate said Hall effect device to a first condition.

10. The sensor recited in claim 9, wherein said magnet, said first flux collector, said second flux collector, and said third flux collector form a low reluctance flux path when said target is positioned away from the predetermined position adjacent said sensor, said low reluctance flux path drawing the magnetic field through said Hall effect device to actuate said Hall effect device to a second condition different than said first condition.

11. A sensor for sensing the position of a ferromagnetic target relative to the sensor, said sensor comprising:
   a Hall effect device responsive to a change in a magnetic field acting on said Hall effect device;
   a magnet for producing a magnetic field that acts on said Hall effect device, said target changing the magnetic field acting on said Hall effect device as the position of the target relative to the sensor changes;
   at least one flux collector positioned on a first side of said magnet corresponding to a first pole of said magnet for concentrating said magnetic field on said Hall effect device; and
   at least one flux collector positioned on a second side of said magnet opposite said first side corresponding to a second pole of said magnet opposite said first pole of said magnet for reducing the reluctance of a magnetic flux path through the target.

12. The sensor recited in claim 11, wherein said at least one flux collector positioned on said first side of said magnet comprises:
   a first flux collector having a first portion extending parallel to a path of relative movement of said target and said sensor and a second portion extending transverse to said first portion and terminating adjacent to said Hall effect device; and
   a second flux collector having a third portion extending parallel to a path of relative movement of said target and said sensor and located in alignment with said space and a fourth portion projecting transverse to said third portion and terminating adjacent to said Hall effect device;
   said at least one flux collector positioned on said second side of said magnet comprising an L-shaped third flux collector, said third flux collector having one leg of the L-shape extending parallel to a path of relative movement of said target and said sensor and the other leg of the L-shape extending adjacent and facing said magnet.

13. The sensor recited in claim 12, wherein said first portion of said first flux collector is bifurcated at one end thus having two spaced apart portions; said second flux collector has a fifth portion that extends from said fourth portion in a direction opposite the direction said third portion extends from said fourth portion to minimize flux leakage to adjacent parts; and said fifth portion is bifurcated.

14. A sensor for sensing the position of a ferromagnetic target relative to the sensor, said sensor comprising:
   a Hall effect device responsive to a change in a magnetic field acting on said Hall effect device;
   a magnet for producing a magnetic field that acts on said Hall effect device, said target changing the magnetic field acting on said Hall effect device as the position of the target relative to the sensor changes;
   at least one flux collector positioned adjacent a first pole of said magnet for concentrating said magnetic field on said Hall effect device;
   at least one flux collector positioned adjacent a second pole of said magnet opposite said first pole of said magnet for reducing the reluctance of a magnetic flux path through the target;

wherein said at least one flux collector positioned adjacent said first pole comprises a first flux collector having a first portion extending parallel to a path of relative movement of said target and said sensor and a second portion extending transverse to said first portion and terminating adjacent to said Hall effect device, said at least one flux collector further comprising a second flux collector having a third portion extending parallel to a path of relative movement of said target and said sensor and located in alignment with said space and a fourth portion projecting transverse to said third portion and terminating adjacent to said Hall effect device; and said at least one flux collector positioned adjacent said second pole comprising an L-shaped third flux collector, said third flux collector having one leg of the L-shape extending parallel to a path of relative movement of said target and said sensor and the other leg of the L-shape extending adjacent and facing said magnet.

15. The sensor recited in claim 14, wherein said first portion of said first flux collector is bifurcated at one end thus having two spaced apart portions; said second flux collector has a fifth portion that extends from said fourth portion in a direction opposite the direction said third portion extends from said fourth portion to minimize flux leakage to adjacent parts; and said fifth portion is bifurcated.

* * * * *